(12) United States Patent
Peng et al.

(10) Patent No.: US 10,604,453 B1
(45) Date of Patent: Mar. 31, 2020

(54) COATING SYSTEMS AND FORMULATIONS FOR CEMENTITIOUS ARTICLES

(71) Applicant: James Hardie Technology Limited, Dublin (IE)

(72) Inventors: Weiling Peng, Rancho Cucamonga, CA (US); Caidian Luo, Rancho Cucamonga, CA (US)

(73) Assignee: James Hardie Technology Limited, Dublin (IE)

(*) Notice: Subject to any disclaimer, the term of this patent is extended or adjusted under 35 U.S.C. 154(b) by 234 days.

(21) Appl. No.: 15/798,154

(22) Filed: Oct. 30, 2017

Related U.S. Application Data

(60) Provisional application No. 62/415,326, filed on Oct. 31, 2016.

(51) Int. Cl.
*C04B 41/48* (2006.01)
*C04B 41/00* (2006.01)
*C09D 163/00* (2006.01)
*C04B 41/63* (2006.01)
*C08K 3/22* (2006.01)

(52) U.S. Cl.
CPC ........ *C04B 41/4853* (2013.01); *C04B 41/009* (2013.01); *C04B 41/63* (2013.01); *C09D 163/00* (2013.01); *C08K 2003/2241* (2013.01)

(58) Field of Classification Search
None
See application file for complete search history.

(56) References Cited

U.S. PATENT DOCUMENTS

| | | | | |
|---|---|---|---|---|
| 5,017,632 | A * | 5/1991 | Bredow | C04B 41/009 523/400 |
| 5,418,264 | A * | 5/1995 | Obloh | C08G 59/50 523/414 |
| 5,906,864 | A * | 5/1999 | Osterhold | C09D 163/00 427/410 |
| 6,077,884 | A * | 6/2000 | Hess | C04B 24/281 523/414 |
| 2001/0000236 | A1 * | 4/2001 | Benoit | B32B 7/02 428/500 |
| 2004/0110872 | A1 * | 6/2004 | Hoefer | C09D 163/00 523/400 |
| 2006/0135656 | A1 * | 6/2006 | Briand | C04B 28/04 523/401 |
| 2013/0090413 | A1 * | 4/2013 | Kawahara | C08G 59/186 523/426 |
| 2013/0260145 | A1 * | 10/2013 | Kishikawa | C03C 17/3405 428/337 |
| 2014/0099508 | A1 * | 4/2014 | Zhou | C08K 5/17 428/413 |
| 2014/0141239 | A1 * | 5/2014 | Ilfrey | B05D 5/02 428/339 |

* cited by examiner

*Primary Examiner* — Megan McCulley
(74) *Attorney, Agent, or Firm* — Knobbe, Martens, Olson & Bear, LLP

(57) ABSTRACT

Coating compositions suitable for machined cementitious substrates are provided. The coating compositions provide adhesion to the machined cementitious substrate while maintaining high mechanical film strength. The coating compositions are also compatible with industrial implementation, and exhibit good pot life.

9 Claims, 3 Drawing Sheets

COATING SYSTEMS AND FORMULATIONS FOR CEMENTITIOUS ARTICLES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to coatings for building materials, and in particular, to coating systems and formulations suitable for machined surfaces of cementitious articles.

Description of the Related Art

Cementitious building materials such as fiber cement boards may be machined for any number of reasons, for example, to provide surface features, to modulate the texture of a surface for fitment, or to provide attachment points. The machining process may involve grinding, sanding, or polishing, and will necessarily remove and reshape a portion of the surface of the material. The machined portion will generally have different surface characteristics than an unmachined article. Often, the machining process may result in smoothing of the fiber cement substrate surface which reduces the ability of the surface to adhere to coatings such as paint. It is particularly difficult to maintain paint adhesion to a machined face of a fiber cement board made by the Hatschek process which involves formation of multiple layers of thin fiber cement films one on top of the other until the desired thickness is achieved. In some instances, paint on machined edges of such fiber cement boards may peel over time and exhibit low resistance to weathering and climate cycling.

SUMMARY

Disclosed herein are various embodiments of a waterborne coating composition suitable for sealing cementitious articles, such as fiber cement building materials. The coating composition is particularly suited for sealing machined fiber cement surfaces, which is traditionally difficult to achieve without surface treatment. The coating composition comprises a waterborne emulsion of an aliphatic epoxy resin having a small and controlled emulsion particle size. Such an emulsion was found to provide a film-forming composition of desired strength and adhesion on machined cementitious surfaces. The coating composition may also comprise a first curing agent and a second curing agent, each curing agent having amine functional groups. The coating composition is formulated to achieve a balance between high film strength and strong adhesion on machined cementitious surfaces.

In one embodiment, the coating composition includes an emulsion comprising an aliphatic epoxy resin having a monomer

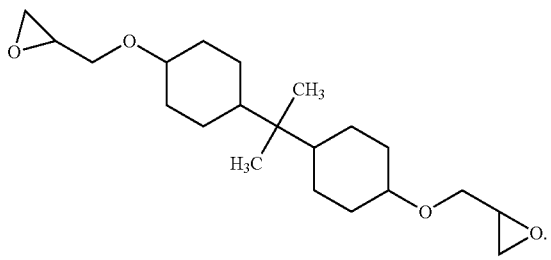 [SMILES: CC(C)(C1CCC(OCC2CO2)CC1)C1CCC(OCC2CO2)CC1]

The emulsion has a particle size of about 0.1 to about 50 microns. The coating composition further includes a first curing agent and a second curing agent, with each curing agent having amine hydrogen functional groups. The first curing agent has a viscosity of about 100 to 1,000 cP and comprises compounds having the formula

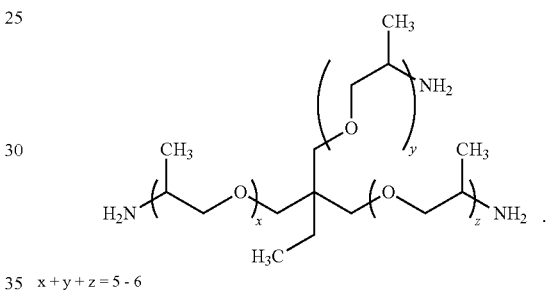

$x+y+z=5-6$

The second curing agent has a viscosity of 25,000 to 50,000 cP, and comprises a polyamine of ammoniated oxirane. The ratio of amine hydrogen functional groups in the first curing agent is about 0.25 to about 2 equivalents relative to one equivalent of epoxide functional groups in the aliphatic epoxy resin, while the ratio of amine hydrogen functional groups in the second curing agent is about 0.05 to about 0.5 equivalents relative to one equivalent of epoxide functional groups in the aliphatic epoxy resin.

In additional implementations, the coating composition includes water up to a predetermined solid content, which may be 10 to 30% total solids. In some embodiments, the coating composition further comprises an emulsifier, a defoamer, and/or a pigment such as titanium dioxide. The coating composition may exhibit extended pot life and compatibility with industrial processing techniques.

The coating composition comprises an epoxy resin having a monomer including a cycloalkyl group. The coating composition also includes a first curing agent comprising an oxyalkylene for providing wettability to the composition, and a second curing agent comprising a polyamine. The second curing agent has a higher viscosity than the first curing agent. The first curing agent has amine hydrogen functional groups in about 0.25 to about 2 equivalents, and the second curing agent has amine hydrogen functional groups in about 0.05 to about 0.5 equivalents, relative to one equivalent of epoxide functional groups in the epoxy resin.

In additional implementations, the chemical structures of the epoxy resin, first curing agent, and second curing agent are further defined. In some embodiments, the monomer of the epoxy resin includes a quaternary carbon center. In some embodiments, the epoxy resin has a monomer

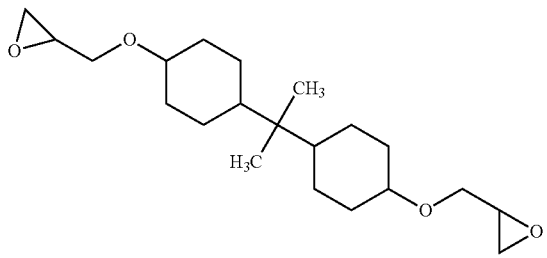 [SMILES: CC(C)(C1CCC(OCC2CO2)CC1)C1CCC(OCC2CO2)CC1]

and may be a hydrogenated bisphenol A. In some embodiments, the first curing agent comprises primary amines and/or a branched oxyalkylene, and may comprise compounds having the formula

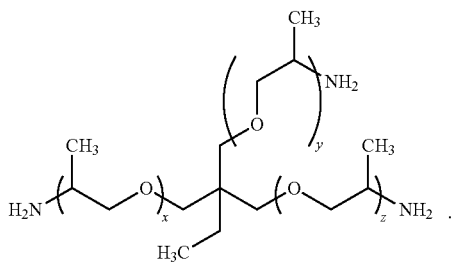

$x + y + z = 5 - 6$

In further embodiments, the second curing agent comprises a polyamine of ammoniated oxirane.

In still further embodiments, a fiber cement article is coated with the coating composition according to certain embodiments. The fiber cement surface can be a machined surface having burnishing from contact with a machine tool. In some embodiments, the coating may achieve a wet adhesion picking on the machined surface of less than about 30% following submersion for 24 hours.

In another embodiment, a sealing agent for application to a surface of a fiber cement article is provided. The sealing agent includes an emulsion comprising an aliphatic epoxy resin, wherein the aliphatic epoxy resin comprises a monomer including a cycloalkyl group. The emulsion has an emulsion particle size of about 0.1 to about 50 microns. The sealing agent further includes a first amine curing agent comprising an oxyalkylene for providing wettability to the composition, and a second amine curing agent comprising a polyamine for stabilizing the emulsion. The second amine curing agent has a higher viscosity than the first amine curing agent. The first amine curing agent has amine hydrogen functional groups in about 0.25 to about 2 equivalents, and the second amine curing agent has amine hydrogen functional groups in about 0.05 to about 0.5 equivalents, relative to one equivalent of epoxide functional groups in the aliphatic epoxy resin.

It is to be understood that the foregoing summary is illustrative only and is not intended to be in any way limiting. In addition to the illustrative aspects, embodiments and features described above, further aspects, embodiments and features will become apparent by reference to the drawings and following detailed description.

DETAILED DESCRIPTION

Figure 1A:
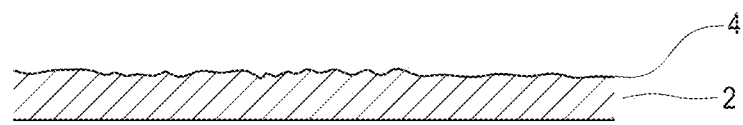
FIGS. 1A and 1B show exemplary embodiments of cementitious substrates having an unmachined face (FIG. 1A) and a burnished machined face (FIG. 1B).

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be used, and other changes may be made, without departing from the spirit or scope of the subject matter presented here. It will be readily understood that the embodiments of the present disclosure, as generally described herein, and illustrated in the figures, can be arranged, substituted, combined, and designed in a wide variety of different configurations, all of which are explicitly contemplated and made part of this disclosure.

The present disclosure generally relates to high-performance coatings designed for cementitious composite materials such as fiber cement building articles. Coating compositions described herein meet the particular demands of improving adhesion to machined surfaces of fiber cement building articles, which tend to have smaller and shallower surface features, thus limiting adhesion of conventional coatings such as paint to the surfaces. While coating adhesion to a machined surface can be improved by mechanically roughening the surface, such mechanical treatment may be undesirable due to requiring additional time and capital resources, thereby creating additional expense, and further, degrading the surface appearance of the building article.

In various embodiments, the coating composition of the present disclosure generally comprises a waterborne emulsion of epoxy resin modified to enhance adhesion to machined cementitious substrates and at least one curing agent having a reactive functional group. The waterborne emulsion can comprise an aliphatic epoxy resin having a controlled emulsion particle size distribution. In one embodiment, the emulsion particle size is between about 0.1 to about 50 microns. The controlled emulsion particle size distribution provides a film-forming composition of desired strength and adhesion on machined cementitious surfaces. In further embodiments, the average emulsion particle size can be about 50 microns, about 25 microns, about 10 microns, about 5 microns, about 2 microns, about 1 micron, about 0.5 microns, about 0.1 micron, or a range of values therebetween. In some implementations the coating composition comprises a first curing agent and a second curing agent, each having an amine functional group that can react with the aliphatic epoxy resin to set and cure the resin. The first curing agent may include an aliphatic amine, and the second curing agent may include a polyamine. In some embodiments, the second curing agent may have a higher viscosity than the first curing agent. The curing agents together provide penetrating capability to the coating composition, and stabilize the emulsion. The coating compositions of various embodiments disclosed herein were surprisingly found to achieve a balance between high film strength and strong adhesion upon application to machined cementitious substrates such as machined surfaces of fiber cement boards that are traditionally difficult to achieve strong coating adhesion without any mechanical surface treatment. Additionally, such coating compositions were found to provide good coating adhesion and protection to machined surfaces under a variety of environmental conditions. In certain instances, only a single coat of the coating formulation to a cementitious substrate is needed to achieve one or more of the objectives provided herein.

In certain embodiments, the coating composition comprises a waterborne emulsion of an aliphatic epoxy resin, and at least one curing agent with reactive curing functional groups. The aliphatic epoxy resin includes an epoxide functional group, which interacts with the reactive curing functional groups to form a film. Additionally, the epoxide functional groups and/or the reactive curing functional groups may interact with each other and with functional groups in a cementitious substrate to create a film that resists ingress of water to the underlying substrate. In one embodiment, the coating composition may include a ratio of about 1 equivalent of total epoxide functional groups to 0.1 to 4 total equivalents of reactive curing functional groups. The aliphatic epoxy resin can be characterized by an equivalent mass per epoxide functional group, while the curing agent can be characterized by an equivalent mass per reactive hydrogen. For example, when the curing agent includes one or more amines, the curing agent can be characterized by an equivalent mass per amine hydrogen. In some embodiments, the coating compositions can have a ratio of about 1 equivalent of total epoxide groups to 0.1 to 4 total equivalents of reactive curing functional groups such as an amine hydrogen; or about 1 equivalent of total epoxide groups to 0.2 to 2 total equivalents of reactive curing functional groups, or about 1 equivalent of total epoxide groups to 1 to 1.8 total equivalents of reactive curing functional groups.

As noted above, the coating composition may include two different curing agents, both of which can be amine curing agents. The two curing agents may perform complementary functions. The first curing agent may be of low viscosity to provide wettability to the coating composition, and the second curing agent may aid in stabilizing the emulsion. The first curing agent may have a viscosity of less than about 1000 cP, for example, about 100 to about 1,000 cP. The equivalent ratios of reactive functional groups in the two curing agents may provide functional characteristics to the coating composition. In some embodiments, the coating composition may include reactive functional groups of the first curing agent in about 0.25 to about 2 equivalents, and reactive functional groups of the second curing agent in about 0.05 to about 0.5 equivalents, relative to one equivalent of epoxide groups in the aliphatic epoxy resin.

In certain embodiments, the coating composition can further comprise one or more additives. The additives can include a solvent, one or more pigments, a defoamer, fillers, an emulsifier, or a combination thereof. The composition also generally comprises water. Each component of the coating composition may be suspended, dispersed, emulsified or form a colloid in the water. In some embodiments, the coating composition includes water to provide a selected solid content. In further embodiments, water is added such that the total solid content of the coating composition is about 5-100%, about 5-90%, about 5-70%, about 5-50%, about 10-40%, about 15-55%, about 20-50%, about 15-40%, about 10-30%, or about 20-40%.

In some embodiments, the coating composition comprises 20% to 85% by weight of aliphatic epoxy resin, 10% to 70% by weight of curing agent, 0 to 30% by weight of pigment and filler, 0 to 80% by weight of water, 0 to 5% of an emulsifier, and 0 to 5% of a defoamer, wherein the total weight of epoxy, curing agent, pigment and filler, water, emulsifier, and defoamer cannot exceed 100%. In further embodiments, the coating composition comprises solids (exclusive of water) in about 34 to 76% by weight of at least one aliphatic epoxy resin, about 24 to 66% by weight of curing agent, 0 to 20% by weight of pigment and filler, 0 to 3% by weight of an emulsifier, and 0 to 3% by weight of a defoamer, wherein the total weight of epoxy, curing agent, pigment and filler, emulsifier, and defoamer cannot exceed 100%. In further embodiments, the coating composition comprises solids (exclusive of water) in about 34 to 76% by weight of at least one aliphatic epoxy resin, about 5 to 20% by weight of a high viscosity curing agent, about 10 to 25% by weight of a low viscosity curing agent, 0 to about 20% by weight of pigment and filler, 0 to about 3% by weight of an emulsifier, and 0 to 3% by weight of a defoamer, wherein the total weight of epoxy, curing agents, pigment and filler, emulsifier, and defoamer cannot exceed 100%.

In order to provide a durable film, coating compositions provided herein may include reactive functional groups, such as electrophilic functional groups, that bond directly to reactive sites, for example hydroxyl groups, on a cementitious substrate surface. Further, the coating composition may be compatible with industrial handling and processing requirements such as having an extended pot life. The pot life measures the amount of time the viscosity of the coating composition is sufficiently low to be workable and to allow application of the coating composition onto a substrate surface. The coating composition provided herein can have a pot life of, for example, at least about 1 hour, at least about 2 hours, at least about 3 hours, at least about 4 hours, at least about 5 hours, at least about 6 hours, at least about 7 hours, at least about 8 hours, at least about 9 hours, at least about 10 hours, at least about 11 hours, or at least about 12 hours. In further embodiments, a coating composition can have a pot life of about 2 to 12 hours. In some embodiments, a coating composition provided herein can be applied to a substrate using conventional coating equipment.

Epoxy Resins

The epoxy resins used in the coating composition of various embodiments can be 100% solid, water based resin, and solvent based resin. The chemistry of the resins can include aromatic epoxy or aliphatic epoxy with 100% solid, water based aromatic epoxy or aliphatic epoxy, UV cure epoxy, and their combinations. In some embodiments, the epoxy resin can include one or more of bisphenol A, bisphenol F, epoxy phenol novolac, epoxy cresol novolac, naphthalene epoxy, or tertiary butyl catechol epoxy, and cycloaliphatic epoxies. In some embodiments, the epoxy resin can be a solid epoxy resin, a liquid epoxy resin, or a combination thereof. The epoxy resin may be an aliphatic epoxy resin including saturated functional groups. In some embodiments, the epoxy resin can comprise a two component waterborne epoxy. Two component waterborne epoxy systems generally include an epoxy resin as one component and a curing agent, or hardener, as second component. The epoxy resin can include a regular epoxy, waterborne resin dispersion, or water reducible epoxy resin. The regular epoxy can be emulsified by addition of a separate or discrete emulsifier. In further embodiments, the coating composition can include only a single aliphatic epoxy resin.

The inventors have surprisingly found that emulsions of aliphatic epoxy resins having a controlled distribution of smaller emulsion particle size provide improved adhesion and film-forming ability on a machined fiber cement surface. The aliphatic epoxy resin particle size in the emulsion can be reduced during a high shear mixing process to the desired particle size. In some embodiments, the aliphatic epoxy resin particle size in the emulsion can be reduced to about 0.01 to 50 microns. In further embodiments, the aliphatic epoxy resin average particle size can be reduced to about 50 microns, about 25 microns, about 10 microns, about 5 microns, about 1 micron, about 0.5 microns, about 0.4 microns, about 0.3 microns, about 0.2 microns, about 0.1 microns, or a range of sizes therebetween.

The epoxy resin can be a liquid, a semi-solid or a solid at ambient temperature. Preferably, the epoxy resin is liquid or is melted into a liquid upon heat curing of the substrate, with curing temperatures up to about 200 F. Without wishing to be limited by theory, it is thought that an aliphatic epoxy resin in liquid form during curing can penetrate and seal the machined substrate. Advantageously, a coating composition including such an aliphatic epoxy resin may form a water-resistant film on a machined surface of a fiber cement substrate after curing. In certain embodiments, the viscosity of liquid epoxy resin can be less than about 50,000 cP, less than about 25,000 cP, less than about 10,000 cP, less than about 5,000 cP, less than about 500 cP, less than about 100 cP, or values therebetween.

The epoxy resin can be characterized by an average molecular weight of about 40,000 g/mol, about 20,000 g/mol, about 10,000 g/mol, about 5,000 g/mol, about 3,000 g/mol, about 1,000 g/mol, below about 1,000 g/mol, about 500 g/mol, about 300 g/mol, about 100 g/mol, or a range of values therebetween. The epoxy resin may further be characterized by an equivalent weight per epoxide (EEW). The EEW is generally measured in grams of resin per molar equivalent of epoxide (g/eq).

In some embodiments, the epoxy resin can include various chemical constituents, for example, one or more of an aromatic epoxy, a BPA epoxy, a non-BPA aromatic epoxy, a hydrogenated bisphenol A epoxy, an aliphatic epoxy, a cyclic aliphatic epoxy, an oligomeric aliphatic epoxy, a polymeric aliphatic epoxy, an oligomeric aromatic epoxy, a polymeric aromatic epoxy, or a combination thereof. The epoxy resin can further include one or more functional groups, for example, a glycidol ether, a diglycidyl, a cycloalkyl, a cyclohexyl, a phenyl glycidyl ether, or a combination thereof. In further embodiments, the epoxy resin can include a hydrogenated diglycidyl ether of bisphenol A.

The epoxy resin can comprise a monomer, or a monomer residue, that includes one or more chemical constituents and/or groups described herein. The monomer residue may arise from reaction of a monomer molecule with one or more of a curing agent, an additive, a cementitious substrate, or another monomer molecule. The monomer residue may be a repeating unit arising from reaction of a monomer with a curing agent, with another monomer molecule, or with a functional group on the substrate. An epoxy resin monomer or monomer residue can include a cyclic aliphatic group, such as, for example, a cyclohexyl group. Generally, the aliphatic epoxy resin includes aliphatic monomers. In various embodiments, the monomer or monomer residue can include zero, one or two cyclic aliphatic groups or a quaternary carbon center, or a combination of zero, one, or two cyclic aliphatic functional groups along with a quaternary carbon center. In further embodiments, the monomer or monomer residue can comprise an acyclic aliphatic functional group. A low viscosity epoxy component (generally, one having <100 cP viscosity at 25° C.) can in some instances be classified as a diluent.

In various embodiments, the epoxy resin(s) used in the coating composition can be selected from those listed in Table 1.

TABLE 1

| Resin | Viscosity (cP, 25° C.) | EEW (g/eq) | Chemical constituent(s) |
|---|---|---|---|
| A | Unk | Unk | Aromatic and arylene epoxies |
| B | 5,000-10,000 | Unk | Non-BPA Aromatic epoxy; 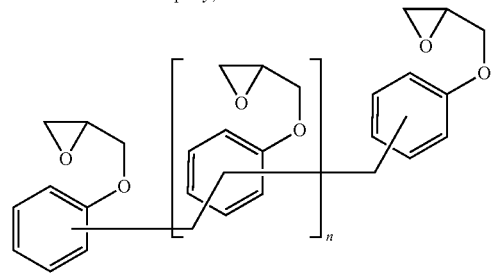 |
| C | 5,000-10,000 | 190-205 g/eq | Aromatic epoxy; 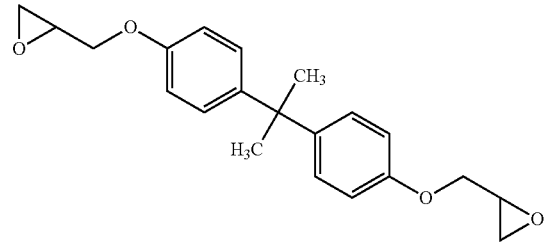 [SMILES: CC(C)(c1ccc(OCC2CO2)cc1)c1ccc(OCC2CO2)cc1] |

TABLE 1-continued

| Resin | Viscosity (cP, 25° C.) | EEW (g/eq) | Chemical constituent(s) |
|---|---|---|---|
| D | 1,000-5,000 | 210-220 g/eq | Cyclic aliphatic epoxy; hydrogenated bisphenol A epoxy 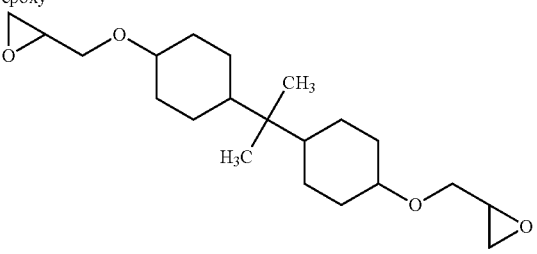 |
| E | <100 | 155-165 g/eq | Cyclic aliphatic epoxy; 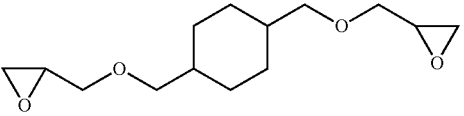 [SMILES: C1CC(COCC2CO2)CCC1COCC1CO1] |
| F | 100-500 | 135-155 g/eq | Aliphatic epoxy |
| G | 10,000-25,000 | 185-200 g/eq | Oligomeric aromatic epoxy; polymeric aromatic epoxy |
| H | <100 | 130-145 g/eq | Branched chain aliphatic epoxy; 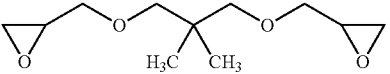 |
| I | <100 | 125-135 g/eq | Straight chain aliphatic epoxy; 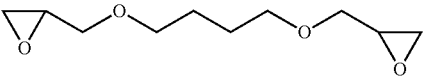 [SMILES: C(CCOCC1CO1)COCC1CO1] |
| J | <100 | 115-125 g/eq | Straight chain aliphatic epoxy; 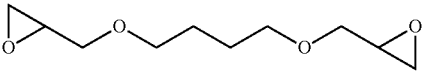 [SMILES: C(CCOCC1CO1)COCC1CO1] |
| K | <100 | 125-145 g/eq | Branched chain aliphatic epoxy; neopentyl alcohol diglycidyl ether |

In certain embodiments, the epoxy resin can be free of aromatic functional groups.

Curing Agents

The coating compositions provided herein generally comprise at least one curing agent selected to promote adhesion and cross-linking of the epoxy resin. The curing agent includes at least one reactive functional group. The curing agent may include an acid such as novolacs, dibasic carboxylic acids, carboxyl phthalocyanines, and dimer and trimer fatty acids; anhydrides of aliphatic and aromatic polycarboxylic acids; acrylics, such as polyacrylates, polymethacrylates, styrene acrylate and polyacrylamides; and amides and miscellaneous nitrogen compounds, such as dicyandiamide, hydrazides, amidoamines and polyamides. The at least one curing agent may include an amine hydrogen functional group, and may be, for example, an amine curing agent.

The reactive functional groups in a curing agent can be tailored to the application and are advantageously matched with the aliphatic epoxy resin. Generally, the reactivity of an amine depends on the type of amine. In some embodiments, the curing agent can include as a functional group a primary amine, a secondary amine, a tertiary amine, a quaternary ammonium, or a combination thereof. The curing agent can be an aliphatic amine, an aromatic amine, or a combination thereof. The curing agent may be a polyetheramine, which may be a branched polyetheramine. The curing agent can include one or more of a polyoxyalkylene polyamine, an arylene polyamine, an aliphatic oligoamine, an aliphatic polyamine, a cyclo-aliphatic amine, a cyclo-aliphatic polyamine, an aliphatic oxyalkylene amine, for example, oxypropylene, an aromatic tertiary amine, an aromatic polyamine a Mannich base, or a combination thereof. The aliphatic amine may be, for example, a branched aliphatic amine, a branched aliphatic oxyalkylene amine. The aliphatic amine can include a cyclic aliphatic functional group, such as, for example, a cyclohexyl functional group. The curing agent may include a branched aliphatic oxyalkylene amine including a primary amine. In some embodiments, the curing agent can comprise trimethylolpropane poly(oxypropylene)triamine.

In further embodiments, the curing agent can comprise a polyamine, such as, for example, a water soluble polyamine. In some embodiments, the water soluble polyamine can act to stabilize an emulsion of an aliphatic epoxy resin in a formulation. The polyamine can be derived from reaction of an electrophilic moiety, such as formaldehyde, nitriles, or epoxides such as epichlorohydrin, with an amine, such as ammonia or an alkylamine. The polyamine may include a solubilizing unit, for example, an oligo- or poly-oxyalkylene unit. The polyamine may comprise ammoniated oxirane. The ammoniated oxirane may be, for example, an N-benzyl derivative of reaction products of oxirane with ammonia.

The curing agent can advantageously be characterized by a low viscosity value. Coating compositions including a lower viscosity amine were found to provide superior adhesion to a machined cementitious substrate. In some embodiments, the curing agent can have a selected viscosity value, or range of values. In certain embodiments, the curing agent can have an absolute viscosity of, or less than, about 50,000 cP, about 25,000 cP, about 10,000 cP, about 5,000 cP, about 1,000 cP, about 500 cP, or a range of values therebetween. Absolute viscosity is generally measured of a prepared curing agent, for example, a commercial curing agent as it is provided (for example, including any solvent or water), and at a temperature of about 25° C. Coating compositions including at least one water soluble curing agent having a low viscosity are preferred. The curing agent may be selected for adhesion to a cementitious substrate.

In some embodiments of the coating composition that include a plurality of curing agents, it may be advantageous to include a low viscosity curing agent and a high viscosity curing agent. The ratios of low viscosity curing agent and high viscosity curing agent may aid in providing a coating composition with adhesion and wettability of a machined substrate while maintaining film strength. Advantageously, a curing agent will aid emulsification of the aliphatic epoxy resin. In some embodiments, the coating composition can include at least one curing agent having an absolute viscosity of about 5,000-10,000 cP, about 1,000-5,000 cP, about 100-1,000 cP, less than about 1000 cP, or less than about 500 cP, and at least one curing agent having an absolute viscosity of about 100-1,000 cP, about 1,000-5,000 cP, about 5,000-10,000 cP, about 10,000-25,000 cP, or about 25,000-50,000 cP.

In various embodiments, coating compositions provided herein can include a ratio of about 1 equivalent of total epoxide groups to 0.1 to 2 equivalents of amine hydrogens in the low viscosity curing agent, about 1 equivalent of total epoxide groups to 0.2 to 1.5 equivalents of amine hydrogens in the low viscosity curing agent, about 1 equivalent of total epoxide groups to 0.25 to 2 equivalents of amine hydrogens in the low viscosity curing agent, or about 1 equivalent of total epoxide groups to 0.5 to 1.5 equivalents of amine hydrogens in the low viscosity curing agent. In further embodiments, coating compositions provided herein can include a ratio of about 1 equivalent of total epoxide groups to 0.05 to 0.5 equivalents of amine hydrogens in the high viscosity curing agent, or about 1 equivalent of total epoxide groups to 0.1 to 0.3 equivalents of amine hydrogens in the high viscosity curing agent. In some embodiments, the coating composition can include specified amounts of both a low viscosity curing agent and a high viscosity curing agent. Thus, the ratio of equivalents of amine hydrogens between two or more curing agents in a coating composition according to various embodiments of the present disclosure can advantageously be selected. In some embodiments, the ratio of amine hydrogen equivalents in the first curing agent to the amine hydrogen equivalents in the second curing agent is about 1 equivalent of amine hydrogens in the high viscosity curing agent to 1 to 11 equivalents of amine hydrogens in the low viscosity curing agent, or about 1 equivalent of amine hydrogens in the high viscosity curing agent to 3 to 8 equivalents of amine hydrogens in the low viscosity curing agent.

The curing agent in the coating composition of certain embodiments can be characterized by an amine value. In some embodiments, the curing agent can have an amine value of about 10-500 mg KOH/g, about 50-300 mg KOH/g, or about 150-200 mg KOH/g. Alternatively or in addition, the curing agent can be characterized by an amine hydrogen equivalent weight (AHEW), generally having the units of grams of curing agent per molar equivalent of amine hydrogen (g/eq). In various embodiments, the curing agent can have an AHEW of 50 to 500 AHEW, about 50 to about 300, about 75 to about 300, about 75 to about 100, or about 200 to about 300. The coating composition provided herein may comprise one or more curing agents having selected amine values and/or AHEW.

In various embodiments, a curing agent, or total curing agents, can be present in the coating composition in about 5% to 70% by weight, about 10% to 60% by weight, or about 10% to 30% of the total solids in the composition.

In various embodiments, the curing agent(s) used in the coating composition can be selected from those listed in Table 2.

TABLE 2

| Curing Agent | Viscosity (cP, 25° C.) | Amine value/ AHEW (g/eq) | Chemical constituent(s) |
|---|---|---|---|
| A | <1,000 | 155-175 mg KOH/g | Aromatic tertiary amines; 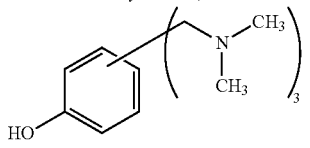 |
| B | 1,000-5,000 | Unk | Mannich base aliphatic amine |
| C | 25,000-50,000 | 200 AHEW | Oligomeric aliphatic amines; polyoxyalkylene polyamine; polymeric aliphatic amines, 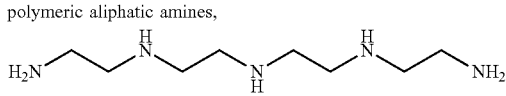 |

TABLE 2-continued

| Curing Agent | Viscosity (cP, 25° C.) | Amine value/ AHEW (g/eq) | Chemical constituent(s) |
|---|---|---|---|
| D | 25,000-50,000 | 150-190 mg KOH/g; 275 AHEW | Polyoxyalkylene polyamines; N-benzyl derivatives of ammoniated oxirane |
| E | Unk | Unk | Aromatic and cyclic aliphatic amines; aliphatic polyamines; primary amines; 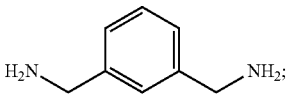 |
| F | 10,000-25,000 | 195-220 mg KOH/g | Aromatic and cyclic aliphatic amines; aliphatic polyamines; 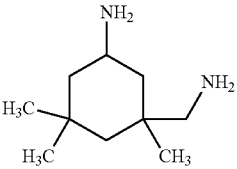 |
| G | Unk | Unk | Aromatic and cyclic aliphatic amines; aliphatic polyamines; primary amines; 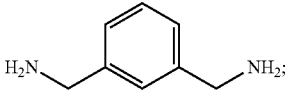 |
| H | 10,000-25,000 | 150-190 mg KOH/g; 300 AHEW | Aromatic and aliphatic polyamines; polymer of 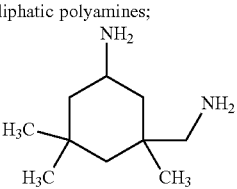 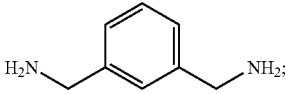 epichlorohydrin, ethylene oxide; primary amines |
| I | 1,000-5,000 | 165-195 mg KOH/g; 300 AHEW | Polyamine adducts |
| J | 100-1,000 | 80 AHEW | Branched aliphatic oxyalkylene amines; primary amines; 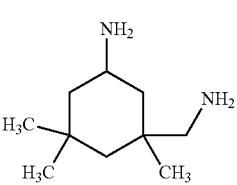 $x + y + z = 5\text{-}6$ |
| K | 10,000-25,000 | 190-230 AHEW | Aromatic polyepoxies; aliphatic oxyalkylene amines |

In certain further embodiments, the curing agent can be free of aromatic functional groups.

Additives

In some embodiments, the coating composition can comprise one or more additives such as etching agents, fillers, emulsifiers, surfactants, diluents, dispersants, defoamers, catalysts, coalescing agents, amines, preservatives, biocides, mildewcides, fungicides, glycols, colorants (for example tints and/or dyes), pigments, rheology modifiers, heat stabilisers, leveling agents, anti-cratering agents, curing indicators, plasticisers, sedimentation inhibitors, photoinitiators, optical brighteners, anti-corrosion agents, and combinations thereof. In various embodiments, the coating composition can comprise 0 to 20% by weight of an additive provided herein. In a further embodiment, the coating composition can comprise additives at a combined total additive percentage of from about 0% to 20% by weight of the composition. In further embodiments, an additive can be present at up to 50% by weight of the coating composition.

In some embodiments, an additive can be a diluent. A diluent can reduce the viscosity of the coating composition without reducing the coating film strength. Advantageously, a diluent can include one or more reactive functional groups, such as, for example, an epoxide group. A diluent can be water soluble, and can include, for example, one or more ether functionalities. In some embodiments, the ethers can be aliphatic ethers, for example, a glycol ether, an ether of propane diol, an ether of butane diol, or a glycerol ether. In further embodiments, a diluent can include one or more glycidyl ethers.

In certain embodiments, the diluent can have an absolute viscosity of about 1,000-5,000 cP, about 500-1,000 cP, about 100-500 cP, or less than about 100 cP.

In some embodiments, the coating composition can comprise an emulsifier. The emulsifier can be present in a coating composition in 0 to 20% by weight relative to the epoxy resin. In further embodiments, the emulsifier can be 0 to 3% by weight, or 0 to 1% by weight of the coating composition. The emulsifier can be, for example, a cationic surfactant, an anionic surfactant, a zwitterionic surfactant, or a non-ionic surfactant. The emulsifier can be one or more of a copolymer of polyoxyethylene and polyoxypropylene, polyoxyethylene, polyoctylphenyl ether, and sodium dodecylbenzenesulfide. The copolymer can be a block or a graft copolymer. The emulsifier can further include a styrenated phenol, a distyrenated phenol, a tristyrenated phenol, a trystyryl ethoxylate, or an oleyl alcohol. In further embodiments, the emulsifier can comprise a polyoxyethylene (POE) and/or disaturated phospholipid (DSP). In further embodiments, the emulsifier can be free of aromatic functional groups.

In further embodiments, the coating composition can comprise a salt, for example, sodium silicate, potassium silicate, or a phosphate. For example, a phosphate can be trisodium phosphate, disodium phosphate, or monosodium phosphate. In some embodiments, the coating composition can include monosodium phosphate as an etching agent.

The coating composition can be diluted with a solvent and/or water. In certain implementations, an amount of solvent and/or water is added to provide a coating composition with a selected solid content. In further embodiments, solvent and/or water can be added to provide a coating composition configured to penetrate the pore structure of a machined cementitious substrate. The solid content of a coating composition can be about 5-100%, about 5-90%, about 5-70%, about 5-50%, about 10-40%, about 20-50%, about 15-40%, about 10-30%, or about 20-40%.

The coating composition may also include a defoamer. The defoamer may provide a low surface tension at a liquid-air interface. Defoamers may include mineral oils. In some embodiments, the defoamer may be silicon-based. In further embodiments, the defoamer may comprise a siloxane, for example, a siloxane polymer. In various embodiments, the defoamer may have a viscosity of, for example, <1000 cP, about 1000 cP, about 2000 cP, about 3000 cP, about 4000 cP, or about 5000 cP, or a range of values therebetween. In various embodiments, the coating composition can comprise about 0.005% to about 0.5% by weight defoamer. For example, the coating composition can comprise about 0.01% to about 0.05% by weight defoamer.

In some embodiments, the coating composition provided herein includes a filler and/or a pigment. The filler and/or pigment can include typical fillers and pigments, such as, for example, titanium dioxide, inorganic pigments such as iron oxides, organic pigments, clays, talc, calcium silicate, and silica. In some embodiments, the coating composition can include filler and pigment in about 2 to 50% by weight, about 2 to 30% by weight, or about 2 to 15% by weight. In some embodiments, the pigment is an inorganic particulate. In further embodiments, the pigment comprises titanium dioxide. In further embodiments, the pigment comprises carbon black. In still further embodiments, the coating composition comprises about 1 to 20% by weight, or about 5 to 15% by weight, of the pigment.

In some embodiments, the coating composition can be free from particulates. In further embodiments, the coating composition can be free from inorganic particulates. In still further embodiments, the coating composition can be free from pigments.

Coated Cementitious Substrates

Figure 1B:

The coating composition can be water-based, for use as a sealer, and may be applied to a machined fiber cement surface such as a fiber cement siding prior to the application of additional coatings, such as paint. The coating composition is also suitable for application on non-machined fiber cement surfaces. Thus, provided herein are cementitious substrates having both machined and non-machined surface with a coating disclosed herein adhered to the machined and non-machined surfaces. For example, the substrate can be a fiber cement substrate having a machined face. FIGS. 1A and 1B depict fiber cement substrates having an unmachined face and a machined face. In FIG. 1A, the substrate 2 has an unmachined face having a rough surface 4. In FIG. 1B, the machined substrate 6 has a machined face 8. As can be seen in FIG. 1B, the machined face 8 of substrate 6 may incur significant burnishing in the machining process, and surface roughness is removed to provide a relatively smooth outer surface. The removal of surface features reduces adhesion of conventional coatings such as paint. Coating compositions of the present disclosure are formulated to be compatible with fiber cement substrates having such burnished surfaces and unburnished surfaces. In some embodiments, the coating can penetrate up to 0.2 in. (5 mm), or up to 0.02 in. (0.5 mm) into the subsurface region of a burnished cementitious substrate.

Figure 2:
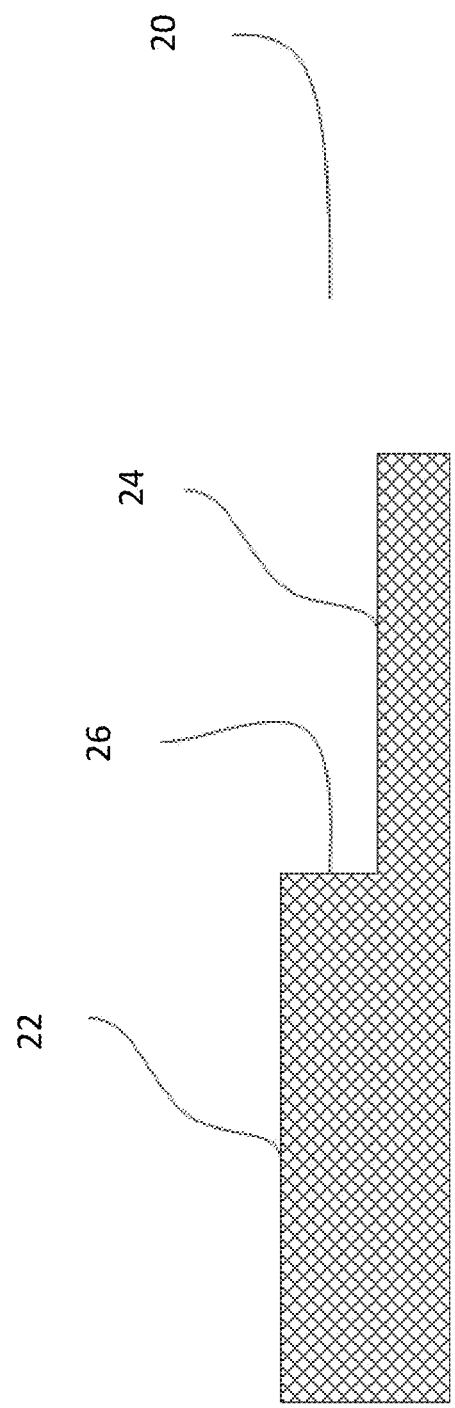
FIG. 2 shows an example of a coated building article having a machined flange according to one embodiment of the invention.

FIG. 2 depicts a cross section of a cementitious building article 20. The article 20 may be, for example, a fiber cement panel or tile for use as a siding, a roofing material, or a load bearing member. The article has a first face 22 which may be an exposed face of the article, and may include machined and/or unmachined surfaces. The article 20 also includes a flange 24 which may provide overlap with other planks or tiles. The flange 24 may have a machined surface. The flange 24 will be shaped so as to meet and provide interlock with other planks or tiles. Flange 24 may be linear in cross section. In the embodiment of FIG. 2, the article 20 has an angled surface 26 as a step between face 22 and flange 24. Surface 26 may be linear in cross section, and may meet surfaces 22 and 24 at an acute or an obtuse angle. Alternatively or in addition, surface 26 may be curved in cross section. Surface 26 may have a machined or an unmachined surface. The article 20 may comprise, or consist of, fiber cement. In various embodiments, surfaces 22, 24, and/or 26 may be coated with a coating composition as provided herein. For example, in one embodiment, each of surface 22, 24, and 26 is coated with a coating composition as provided herein.

Figure 3:
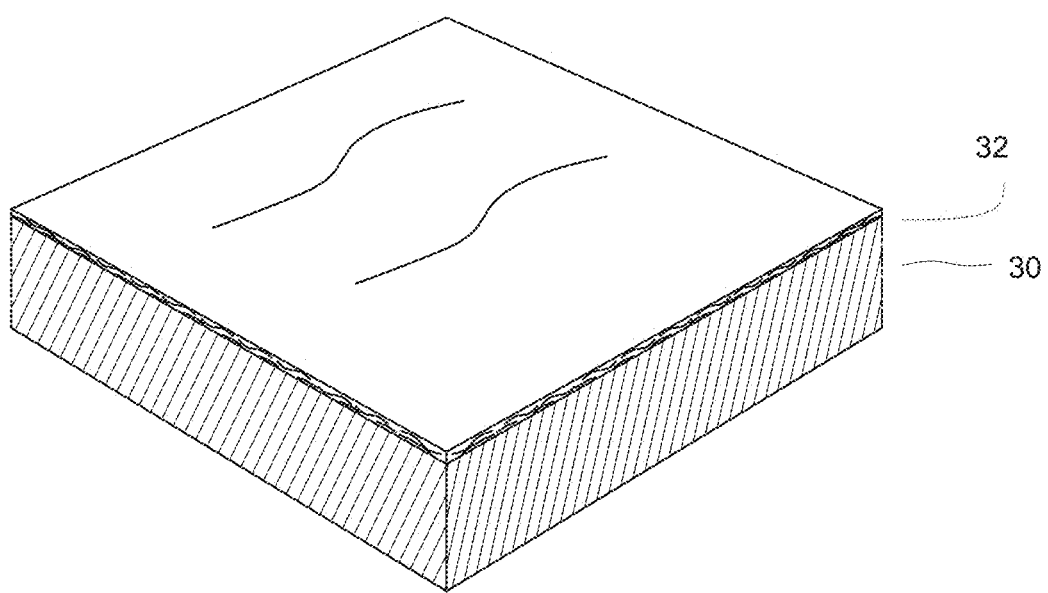
FIG. 3 shows an example of a burnished cementitious substrate in contact with a coating composition according to one embodiment of the invention.

FIG. 3 depicts a cementitious substrate 30 having a coating composition according to certain embodiments herein applied to a burnished surface 32.

Generally, machining may create burnishing on the machined surface. The degree of burnishing can be correlated to the state of the machine tool which is used to treat the surface. Specifically, the number of cuts created by the machine tool will affect the sharpness of the cutting blade of the machine tool over its lifetime. This in turn will impact on the degree of burnishing a surface will incur during machining. A tool that has made more cuts will create a more burnished surface than a new tool being used for the first time. A machined surface in various embodiments can be created by a machine tool of about 500, about 1000, about 2000, about 3000, about 5000 cuts, or values therebetween.

The coating composition can be applied to a substrate to form a coated substrate. The coating compositions may be compounded using manufacturing methods such as dispersion, grinding, mixing, stirring, shaking, agitating, inverting, by any other suitable method, or by a combination of methods. The mixed coating composition may be applied to a substrate using methods such as flood coating, spraying, rolling or wiping. In some embodiments, a single coat of the coating composition is applied. In further embodiments, only a single coat is needed to achieve an advantage stated herein. Following application to a substrate, the coating composition can be cured by heating or other methods. The coated, cured substrate can have a dry film thickness (DFT) of about 0.05 to 5 mils, for example, about 0.1 to 3 mil, about 0.2 to 2 mil, about 0.3 to 1.5 mil, about 0.5 to 1.5 mil, or about 0.5 to 1 mil. A coated substrate can, in turn, be coated with any additional coatings, for example, a primer, and/or a top coat such as a paint.

A cementitious substrate can include pores from 0.001 microns to 400 microns. In various embodiments, the coating may penetrate about 0.01 in. (0.3 mm), about 0.02 in. (0.5 mm), about 0.05 in. (1.3 mm), about 0.1 in. (2.5 mm), about 0.15 in. (3.8 mm), or about 0.2 in. (5 mm), or a range of values therebetween, below the machined surface of a substrate. The coating may be mechanically interlocked below the surface of the substrate. In some embodiments, the coating seals the substrate from water ingress. Some embodiments provide a coating on a substrate containing hydroxyl functional groups. In certain implementations, the coating includes at least two reactive functional groups, each functional group being capable of forming chemical bonds with the hydroxyl functional groups in the substrate.

To measure adhesion of a coating, tape is applied to a coated substrate, and the tape is removed. The percentage of coating removed with the tape is measured in percent, relative to the area covered by the tape. In some embodiments, substrate failure (for example, loss of cohesion within the substrate) predominates over clean removal of the coating from the substrate in an adhesion test. A standard procedure for measuring adhesion picking is given in ASTM D3359.

Unexpectedly, it was found that some embodiments of coating compositions provided herein exhibited improved adhesion to machined substrate surfaces. In some embodiments, the coating composition can create a coating on a machined substrate having adhesion picking of less than about 50%, less than about 40%, less than about 30%, less than about 20%, less than about 10%, or less than about 5%. In further embodiments, adhesion picking is wet adhesion picking following 24 hours of submersion in water. In further embodiments, adhesion picking is measured following environmental cycling. In some embodiments, adhesion picking is measured following environmental cycles numbering 1, about 10, about 25, about 50, about 100, about 200 or about 300. In yet further embodiments, adhesion picking is measured following exposure to UV radiation, which can be UVA or UVB, and exposure can be about 500 hours.

Conventional thinking would hold that coatings known to have a high film strength should provide better adhesion and wear resistance. However, typical conventional coatings were found not be suitable for certain machined fiber cement surfaces. Thus, the present disclosure provides a coating that achieves a balance between high film strength and adhesion. Thus, coating compositions provided herein achieve a critical balance. The constituents of coating compositions of the present disclosure are chosen to work together to achieve such a balance.

A coating for an external building material may be exposed to wet weather such as snow, rain, and combinations thereof; to wind; to mechanical impacts; to high or low temperatures; and to environmental cycles. A coating composition provided herein may maintain adhesion and strength performance under exposure to disparate climatic conditions. Certain embodiments may advantageously provide coatings for finished fiber cement building materials with reduced water absorption, reduced rate of water absorption, lower water migration, and/or lower water permeability. Certain embodiments may also impart building articles with enhanced adhesion under environmental cycling conditions, enhanced chemical and salt resistance, and improved mechanical properties. Additionally, a coating for an external building material may be exposed to sunlight, and in particular visible light and UV rays. Some embodiments of coating compositions are resistant to radiation. In further embodiments, a coating composition provided herein can achieve strong film strength while resisting UV degradation.

In some embodiments, a coating composition proved herein can provide mechanical adhesion to a machined substrate surface. Furthermore, a coating composition provided herein may provide a moisture barrier for the underlying substrate. In yet further embodiments, the advantages are realized even after significant climate cycling. In some embodiments, climate cycling includes environmental cycling. Advantageously, the coating will exhibit reduced blistering following environmental cycling, relative to a conventional epoxy system. Embodiments of the coating compositions will be illustrated in the following examples, which are not to be construed as limiting of the entirety of the disclosure herein.

EXAMPLES

Example 1

A number of sample coating compositions were formulated, as indicated in Table 3. Each formulation was diluted with water to provide a coating composition having the indicated % weight of total combined solids ("Total Solids").

TABLE 3

| No. | Total Solids (wt %) | Epoxy (equiv. or wt %) | Amine 1 (amine hydrogen equiv. or wt %) | Amine 2 (amine hydrogen equiv. or wt %) | Other (equiv. or % weight) |
|---|---|---|---|---|---|
| 1 | 20% | Typical epoxy, 50% wt | Curing Agent A, 2.0 wt % | None | phosphate, 50% wt |
| 2 | 40% | Resin I, 1 equiv | Curing Agent K, 1 equiv | None | None |
| 3 | 40% | Resin I, 1 equiv | Curing Agent K, 2 equivs | None | None |
| 4 | 25% | Resin H, 1 equiv | Curing Agent K, 1 equiv | None | None |
| 5 | 40% | Resin H, 1 equiv | Curing Agent K, 1 equiv | None | None |
| 6 | 40% | Resin I, 1 equiv | Curing Agent I, 0.5 equivs | None | Typical epoxy, 0.035 equivs |
| 7 | 40% | Resin I, 1 equiv | Curing Agent I, 1 equiv | None | None |
| 8 | 25% | Resin C, 1 equiv | Curing Agent I, 0.5 equivs | None | None |
| 9 | 40% | Resin C, 1 equiv | Curing Agent I, 0.5 equivs | None | None |
| 10 | 40% | Resin H, 1 equiv | Curing Agent I, 1 equiv | None | None |
| 11 | 40% | Resin I, 1 equiv | Curing Agent H, 1 equiv | None | None |
| 12 | 40% | Resin H, 1 equiv | Curing Agent H, 1 equiv | None | None |
| 13 | 30% | Resin H, 1 equiv | Curing Agent H, 1 equiv | None | None |
| 14 | 40% | Resin I, 1 equiv | Curing Agent I, 1.5 equivs | None | None |
| 15 | 40% | Resin I, 1 equiv | Curing Agent H, 1.5 equivs | None | None |
| 16 | 30% | Resin I, 1 equiv | Curing Agent H, 1.5 equivs | None | None |
| 17 | 50% | Resin C, 1 equiv | Curing Agent J, 1 equiv | None | None |
| 18 | 35% | Resin C, 1 equiv | Curing Agent J, 1 equiv | None | None |
| 19 | 40% | Resin H, 1 equiv | Curing Agent K, 1 equiv | None | phosphate, 10% wt |
| 20 | 30% | Resin H, 1 equiv | Curing Agent K, 1 equiv | None | phosphate, 10% wt |
| 21 | 40% | Resin H, 1 equiv | Curing Agent K, 1 equiv | None | phosphate, 25% wt |
| 22 | 50% | Resin H, 1 equiv | Curing Agent K, 0.75 equivs | Curing Agent J, 0.25 equivs | None |
| 23 | 50% | Resin C, 1 equiv | Curing Agent D, 0.2 equivs | Curing Agent J, 0.8 equivs | None |
| 24 | 35% | Resin C, 1 equiv | Curing Agent D, 0.2 equivs | Curing Agent J, 0.8 equivs | None |
| 25 | 50% | Resin C, 1 equiv | Curing Agent C, 0.2 equivs | Curing Agent J, 0.8 equivs | None |
| 26 | 35% | Resin C, 1 equiv | Curing Agent C, 0.2 equivs | Curing Agent J, 0.8 equivs | None |
| 27 | 50% | Resin D, 1 equiv | Curing Agent D, 0.25 equivs | Curing Agent J, 0.75 equivs | None |
| 28 | 40% | Resin D, 1 equiv | Curing Agent D, 0.25 equivs | Curing Agent J, 1.25 equivs | None |
| 29 | 40% | Resin D, 1 equiv | Curing Agent D, 0.25 equivs | Curing Agent J, 1.0 equivs | None |
| 30 | 40% | Resin D, 1 equiv | Curing Agent D, 0.25 equivs | Curing Agent J, 0.75 equivs | None |
| 31 | 40% | Resin D, 1 equiv | Curing Agent D, 0.25 equivs | Curing Agent J, 0.6 equivs | None |
| 32 | 40% | Resin D, 1 equiv | Curing Agent D, 0.25 equivs | Curing Agent J, 1 equiv | None |
| 33 | 40% | Resin D, 1 equiv | Curing Agent B, 0.25 equivs | Curing Agent J, 1 equiv | None |
| 34 | 50% | Resin D, 1 equiv | Curing Agent C, 0.25 equivs | Curing Agent J, 1 equiv | None |
| 35 | 40% | Resin D, 1 equiv | Curing Agent C, 0.15 equivs | Curing Agent J, 0.95 equivs | Curing Agent D, 0.15 equivs |
| 36 | 40% | Resin D, 1 equiv | Curing Agent K, 0.15 equivs | Curing Agent J, 1.1 equivs | None |
| 37 | 40% | Resin D, 1 equiv | Curing Agent C, 0.1 equivs | Curing Agent J, 0.95 equivs | emulsifier, 6% wt |
| 38 | 40% | Resin D, 1 equiv | Curing Agent C, 0.2 equivs | Curing Agent J, 0.85 equivs | emulsifier, 6% wt |
| 39 | 40% | Resin D, 1 equiv | Curing Agent C, 0.1 equivs | Curing Agent J, 0.95 equivs | emulsifier, 6% wt |
| 40 | 35% | Resin D, 1 equiv | Curing Agent D, 0.25 equivs | Curing Agent J, 0.95 equivs | emulsifier, 5% wt |
| 41 | 35% | Resin D, 1 equiv | Curing Agent D, 0.25 equivs | Curing Agent J, 0.95 equivs | emulsifier, 3% wt |
| 42 | 35% | Resin D, 1 equiv | Curing Agent D, 0.25 equivs | Curing Agent J, 0.95 equivs | emulsifier, 1% wt |
| 43 | 35% | Resin D, 1 equiv | Curing Agent D, 0.25 equivs | Curing Agent J, 0.5 equivs | emulsifier, 5% wt |
| 44 | 35% | Resin D, 1 equiv | Curing Agent D, 0.25 equivs | Curing Agent J, 0.5 equivs | emulsifier, 3% wt |
| 45 | 29% | Resin D, 1 equiv | Curing Agent D, 0.25 equivs | Curing Agent J, 0.95 equivs | emulsifier, 3% wt |
| 46 | 29% | Resin D, 1 equiv | Curing Agent D, 0.25 equivs | Curing Agent J, 0.95 equivs | emulsifier, 3% wt |
| 47 | 29% | Resin D, 1 equiv | Curing Agent D, 0.2 equivs | Curing Agent J, 1 equiv | None |
| 48 | 29% | Resin D, 1 equiv | Curing Agent D, 0.2 equivs | Curing Agent J, 1 equiv | emulsifier, 3% wt |
| 49 | 29% | Resin D, 1 equiv | Curing Agent D, 0.15 equivs | Curing Agent J, 1.05 equivs | None |
| 50 | 29% | Resin D, 1 equiv | Curing Agent D, 0.15 equivs | Curing Agent J, 1.05 equivs | emulsifier, 3% wt |
| 51 | 29% | Resin D, 1 equiv | Curing Agent D, 0.1 equivs | Curing Agent J, 1.1 equivs | None |
| 52 | 29% | Resin D, 1 equiv | Curing Agent C, 0.2 equivs | Curing Agent J, 1 equiv | emulsifier, 3% wt |
| 53 | 29% | Resin D, 1 equiv | Curing Agent C, 0.2 equivs | Curing Agent J, 0.9 equivs | emulsifier, 3% wt |
| 54 | 35% | Resin D, 1 equiv | Curing Agent D, 0.15 equivs | Curing Agent J, 1.05 equivs | emulsifier, 1% wt |
| 55 | 35% | Resin D, 1 equiv | Curing Agent D, 0.15 equivs | Curing Agent J, 0.9 equivs | emulsifier, 1% wt |
| 56 | 35% | Resin D, 1 equiv | Curing Agent C, 0.25 equivs | Curing Agent J, 0.95 equivs | emulsifier, 1% wt |
| 57 | 30% | Resin D, 1 equiv | Curing Agent D, 0.18 equivs | Curing Agent J, 1.15 equivs | defoamer, 0.03% wt; emulsifier, 1% wt; pigment, 5.5% wt |

Where an emulsifier appears, the wt % given is relative to the weight of epoxy resin.

Results

Example 2

Various Samples provided in Example 1 were applied to machined fiber cement boards. Briefly, machined fiber cement boards were coated using the indicated surface coating composition. The coated boards were then cured at a surface temperature of 120-180 F, to give a DFT between 0.5 and 1 mil. The sealed, cured boards were then coated with a topcoat of typical exterior paint. The boards underwent a second curing, at a temperature of 120-180 F, for several hours.

Some finished boards were tested for adhesion following curing. These adhesion results are indicated as "dry" in Table 4. Some finished boards were exposed to simulated climatic conditions. Conditions include exposure to UVA or UVB for at least 500 hours, environmental cycling of 24 cycles, and submersion in water for 24 hours. Following simulation of climatic conditions, coatings were tested for adhesion by tape removal according to ASTM D3359-09.

Coating compositions of Example 1 gave the indicated adhesion picking after submersion in water for 24 hours, where adhesion type is given as "wet." Where the adhesion type is given as "enviro", coating compositions of Example 1 were submersed in water for 24 hours before undergoing at least one environmental cycle, and finally tested for adhesion picking. These results are summarized in Table 4. In Table 4, the number of lifetime cuts made by the machine tool that was used to machine the coated fiber cement board is indicated under "Surface Burnishing." More cuts denote a higher degree of burnishing on the machined surfaces. Comparative data for a typical epoxy-based sealer was as follows: a surface at 1 mil DFT, on a machined face from a tool of 2300 cuts, under a wet adhesion test resulted in 95% adhesion picking.

TABLE 4

| Sample No. (from Table 3) | DFT/mil | Surface Burnishing/ Number of Cuts | Adhesion type | Average % Adhesion Picking |
|---|---|---|---|---|
| Comparative Sample (typical epoxy sealer) | 1 | 2300 | Wet | 95 |
| 1 | 0.5 | 0 | Dry | 0 |
| | | 0 | Wet | 0 |
| | | 1200 | Dry | 0 |
| | | 1200 | Wet | 0 |
| | | 2600 | Dry | 0 |
| | | 2600 | Wet | 1.5 |
| | | 2600 | enviro | 27.5 |
| 2 | 1 | 2600 | Dry | 0 |
| | | 2600 | Wet | 1 |
| | 0.8 | 2600 | Dry | 0 |
| | | 2600 | Wet | 20 |
| 3 | 1 | 2600 | Dry | 0 |
| | | 2600 | Wet | 10 |
| 4 | 0.6 | 2600 | Dry | 0 |
| | | 2600 | Wet | 3 |
| | | 2600 | enviro | 25.5 |
| 5 | 1 | 2600 | Dry | 0 |
| | | 2600 | Wet | 0 |
| | | 2600 | enviro | 1 |
| 6 | 1 | 2600 | Dry | 1.5 |
| | | 2600 | Wet | 25 |
| 7 | 0.8 | 2600 | Dry | 0 |
| | | 2600 | Wet | 7.5 |
| | 1 | 2600 | Dry | 0 |
| | | 2600 | Wet | 8.5 |
| 8 | 0.63 | 2600 | Dry | 0.5 |
| | | 2600 | Wet | 1 |
| | | 2600 | enviro | 5.5 |
| 9 | 1 | 2600 | Dry | 0 |
| | | 2600 | Wet | 1 |
| | | 2600 | enviro | 0 |
| 10 | 0.8 | 2600 | Dry | 2 |
| | | 2600 | Wet | 7.5 |
| 11 | 0.8 | 2600 | Dry | 1.5 |
| | | 2600 | Wet | 11 |
| 12 | 0.8 | 2600 | Dry | 0 |
| | | 2600 | Wet | 0.5 |
| 13 | 0.6 | 2600 | Dry | 1.5 |
| | | 2600 | Wet | 12.5 |
| 14 | 0.8 | 2600 | Dry | 1.5 |
| | | 2600 | Wet | 13.0 |
| 15 | 0.8 | 2600 | Dry | 0 |
| | | 2600 | Wet | 6.5 |
| 16 | 0.6 | 2600 | Dry | 2.5 |
| | | 2600 | Wet | 27.5 |
| 17 | 1 | 2600 | Dry | 0 |
| | | 2600 | Wet | 0 |
| | | 2600 | enviro | 5.25 |
| 18 | 1 | 2600 | Dry | 0 |
| | | 2600 | Wet | 0 |
| | | 2600 | enviro | 2.5 |
| | 0.7 | 2600 | Dry | 0 |
| | | 2600 | Wet | 0 |
| | | 2600 | enviro | 11.25 |
| 19 | 0.8 | 2600 | Dry | 0 |
| | | 2600 | Wet | 13 |
| | | 2600 | enviro | 12.6 |
| 20 | 0.6 | 2600 | Dry | 3 |
| | | 2600 | Wet | 12.5 |
| | | 2600 | enviro | 10 |
| 21 | 0.8 | 2600 | Dry | 0 |
| | | 2600 | Wet | 0.5 |
| | | 2600 | enviro | 1.5 |
| 22 | 1 | 2600 | Dry | 0 |
| | | 2600 | Wet | 8 |
| | | 2600 | enviro | 7.5 |
| 23 | 1 | 2600 | Dry | 0 |
| | | 2600 | Wet | 0 |
| | | 2600 | enviro | 2 |
| 24 | 0.7 | 2600 | Dry | 0 |
| | | 2600 | Wet | 0 |
| | | 2600 | enviro | 0.33 |
| 25 | 1 | 2600 | Dry | 0 |
| | | 2600 | Wet | 0 |
| | | 2600 | enviro | 0 |
| 26 | 0.7 | 2600 | Dry | 0 |
| | | 2600 | Wet | 0 |
| | | 2600 | enviro | 0.5 |
| 27 | 1 | 2600 | Dry | 0 |
| | | 2600 | Wet | 1.5 |
| | | 2600 | enviro | 24.5 |
| 28 | 1 | 2600 | Dry | 0 |
| | | 2600 | Wet | 0 |
| | | 2600 | enviro | 3.25 |
| 29 | 0.8 | 2600 | Dry | 0 |
| | | 2600 | Wet | 0 |
| | | 2600 | enviro | 9.0 |
| 30 | 0.8 | 1500 | Dry | 0 |
| | | 1500 | Wet | 5.5 |
| | 1 | 1500 | Dry | 0 |
| | | 1500 | Wet | 0.5 |
| | | 1500 | enviro | 28.0 |
| 31 | 0.8 | 2600 | Dry | 0 |
| | | 2600 | Wet | 0 |
| | | 2600 | enviro | 3.0 |
| | 1.0 | 1500 | Dry | 0.5 |
| | | 1500 | Wet | 1.0 |
| | | 1500 | enviro | 15 |
| 32 | 0.8 | 1500 | Dry | 0 |
| | | 1500 | Wet | 1 |
| 33 | 0.8 | 2600 | Dry | 0 |
| | | 2600 | Wet | 12.5 |
| | 1.2 | 1500 | Dry | 0 |
| | | 1500 | Wet | 10 |
| 34 | 1.2 | 1500 | Dry | 0 |
| | | 1500 | Wet | 5 |
| 35 | 1 | 1500 | Dry | 0 |
| | | 1500 | Wet | 15 |
| 36 | 0.8 | 1500 | Dry | 0 |
| | | 1500 | Wet | 3 |
| 37 | 1.1 | 1500 | Dry | 0 |
| | | 1500 | Wet | 10.5 |
| | | 1500 | enviro | 27.75 |
| 38 | 1.1 | 1500 | Dry | 1.0 |
| | | 1500 | Wet | 13.0 |
| | | 1500 | enviro | 16.0 |
| 39 | 1.1 | 1500 | Dry | 0 |
| | | 1500 | Wet | 1 |
| | | 1500 | enviro | 7.5 |
| 40 | 1.1 | 2300 | Dry | 0 |
| | | 2300 | Wet | 11 |
| | | 2300 | enviro | 16.25 |

TABLE 4-continued

| Sample No. (from Table 3) | DFT/mil | Surface Burnishing/ Number of Cuts | Adhesion type | Average % Adhesion Picking |
|---|---|---|---|---|
| 41 | 1.1 | 2300 | Dry | 0 |
|  |  | 2300 | Wet | 5 |
|  |  | 2300 | enviro | 4 |
| 42 | 1.1 | 2300 | Dry | 0 |
|  |  | 2300 | Wet | 1 |
|  |  | 2300 | enviro | 5.75 |
| 43 | 1.1 | 2300 | Dry | 0 |
|  |  | 2300 | Wet | 3.5 |
|  |  | 2300 | enviro | 0.5 |
| 44 | 1.1 | 2300 | Dry | 0 |
|  |  | 2300 | Wet | 4 |
|  |  | 2300 | enviro | 11.3 |
| 45 | 0.85 | 2300 | Dry | 0 |
|  |  | 2300 | Wet | 0.5 |
|  |  | 2300 | enviro | 2.5 |
| 46 | 0.85 | 2300 | Dry | 0 |
|  |  | 2300 | Wet | 0 |
|  |  | 2300 | enviro | 6.5 |
| 47 | 0.85 | 2300 | Dry | 0 |
|  |  | 2300 | Wet | 0 |
|  |  | 2300 | enviro | 8 |
| 48 | 0.85 | 2300 | Dry | 0 |
|  |  | 2300 | Wet | 0.75 |
|  |  | 2300 | enviro | 15.6 |
| 49 | 0.85 | 2300 | Dry | 2.5 |
|  |  | 2300 | Wet | 1.5 |
|  |  | 2300 | enviro | 9.75 |
| 50 | 0.85 | 2300 | Dry | 0 |
|  |  | 2300 | Wet | 9 |
|  |  | 2300 | enviro | 8 |
| 51 | 0.85 | 2300 | Dry | 0 |
|  |  | 2300 | Wet | 8 |
|  |  | 2300 | enviro | 17.75 |
| 52 | 0.85 | 2300 | Dry | 0 |
|  |  | 2300 | Wet | 0.5 |
|  |  | 2300 | enviro | 2.0 |
| 53 | 0.85 | 2300 | Dry | 0 |
|  |  | 2300 | Wet | 2.5 |
|  |  | 2300 | enviro | 6.25 |
| 54 | 0.85 | 2300 | Wet | 5 |
|  |  | 2300 | enviro | 15 |
| 55 | 0.85 | 2300 | Wet | 4.5 |
|  |  | 2300 | enviro | 20.25 |
| 56 | 0.85 | 2300 | Wet | 3 |
|  |  | 2300 | enviro | 22.5 |

* All samples were tested at 0 hours pot life, except samples 54-56 which were tested at 1 hour pot life.

Various complete coating composition Samples provided in Example 1 were allowed to stand for the time indicated under "Pot Life." The coatings were then applied to machined fiber cement boards, and the boards cured, using methods described above. Each board was then coated with a topcoat of a typical exterior paint. The finished boards were tested for adhesion following curing. These adhesion results are provided in Table 5.

TABLE 5

POT LIFE RESULTS

| Sample No. (from Table 4) | DFT/ mil | Pot Life/ Hrs | Surface Burnishing/ Number of Cuts | Adhesion type | Average % Adhesion Picking |
|---|---|---|---|---|---|
| 30 | 0.8 | 0 | 1500 | Dry | 0 |
|  |  |  | 1500 | Wet | 5.5 |
|  |  | 3 | 1500 | Dry | 0 |
|  |  |  | 1500 | Wet | 1.0 |
|  |  | 5 | 1500 | Dry | 0.5 |
|  |  |  | 1500 | Wet | 0 |
| 32 | 0.8 | 0 | 1500 | Dry | 0 |
|  |  |  | 1500 | Wet | 1 |
|  |  | 3 | 1500 | Dry | 0 |
|  |  |  | 1500 | Wet | 5 |
|  |  | 6 | 1500 | Dry | 0 |
|  |  |  | 1500 | Wet | 80 |
| 54 | 0.85 | 1 | 2300 | Wet | 5 |
|  |  |  | 2300 | enviro | 15 |
|  |  | 4 | 2300 | Wet | 0 |
|  |  |  | 2300 | enviro | 3 |
| 55 | 0.85 | 1 | 2300 | Wet | 4.5 |
|  |  |  | 2300 | enviro | 20.25 |
|  |  | 4 | 2300 | Wet | 0.5 |
|  |  |  | 2300 | enviro | 5 |
| 56 | 0.85 | 1 | 2300 | Wet | 3 |
|  |  |  | 2300 | enviro | 22.5 |
|  |  | 4 | 2300 | Wet | 0 |
|  |  |  | 2300 | enviro | 25 |

While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A sealing agent for application to a surface of a fiber cement article, comprising:
   an emulsion comprising an aliphatic epoxy resin, wherein the aliphatic epoxy resin comprises a monomer including a cycloalkyl group, wherein the aliphatic epoxy resin further comprises epoxide functional groups, and wherein the emulsion is characterized by an emulsion particle size of about 0.1 to about 50 microns;
   a first amine curing agent and a second amine curing agent, wherein each of the first amine curing agent and the second amine curing agent comprise amine hydrogen functional groups;
   wherein the first amine curing agent comprises an oxyalkylene; and
   wherein the second amine curing agent comprises a polyamine, and wherein the second amine curing agent has a higher viscosity than the first amine curing agent; and
   wherein the first amine curing agent has amine hydrogen functional groups in about 0.25 to about 2 equivalents, and the second amine curing agent has amine hydrogen functional groups in about 0.05 to about 0.5 equivalents, relative to one equivalent of epoxide functional groups in the aliphatic epoxy resin.

2. A water-based coating composition suitable for sealing a surface of a cementitious substrate, comprising:
   an emulsion comprising an aliphatic epoxy resin, wherein the aliphatic epoxy resin comprises epoxide functional groups, and the aliphatic epoxy resin has a monomer

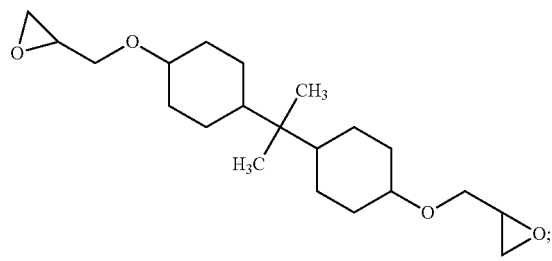 [SMILES: CC(C)(C1CCC(OCC2CO2)CC1)C1CCC(OCC2CO2)CC1]

wherein the emulsion is characterized by an emulsion particle size of about 0.1 to about 50 microns;
   a first curing agent and a second curing agent, wherein each of the first curing agent and the second curing agent comprise amine hydrogen functional groups;
   wherein the first curing agent has a viscosity of about 100 to 1,000 cP and comprises compounds having the formula

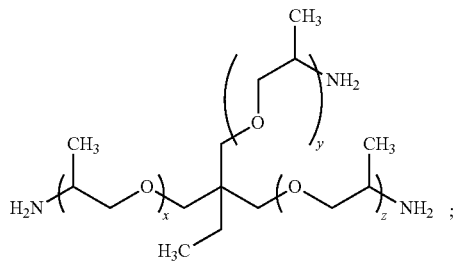

$x + y + z = 5 - 6$ wherein the second curing agent has a viscosity of 25,000 to 50,000 cP, and comprises a polyamine of ammoniated oxirane; and
   wherein the first curing agent has amine hydrogen functional groups in about 0.25 to about 2 equivalents, and the second curing agent has amine hydrogen functional groups in about 0.05 to about 0.5 equivalents, relative to one equivalent of epoxide functional groups in the aliphatic epoxy resin.

3. The coating composition of claim 2, further comprising water.

4. The coating composition of claim 2, having 10 to 30% total solids.

5. The coating composition of claim 2, further comprising an emulsifier.

6. The coating composition of claim 2, further comprising a defoamer.

7. The coating composition of claim 2, further comprising a titanium dioxide pigment.

8. The coating composition of claim 2, wherein the first curing agent has amine hydrogen functional groups in about 1 to about 1.5 equivalents relative to one equivalent of epoxide functional groups in the aliphatic epoxy resin.

9. The coating composition of claim 2, wherein the second curing agent has amine hydrogen functional groups in about 0.1 to about 0.3 equivalents, relative to one equivalent of epoxide functional groups in the aliphatic epoxy resin.

* * * * *